United States Patent Office 3,526,479
Patented Sept. 1, 1970

3,526,479
DIAGNOSTIC ARTICLE AND METHOD FOR
DETECTION THEREWITH
Hans-Georg Rey, Mannheim-Waldhof, Hans-Rudolf
Lange, Lampertheim/Hessen, and Peter Rieckmann,
Mannheim-Waldhof, Germany, assignors to C. F. Boehringer & Soehne G.m.b.H., Mannheim-Waldhof, Germany, a corporation of Germany
No Drawing. Filed Nov. 15, 1966, Ser. No. 594,362
Claims priority, application Germany, Dec. 18, 1965,
B 85,039
Int. Cl. G01n 21/06, 33/16
U.S. Cl. 23—230          23 Claims

ABSTRACT OF THE DISCLOSURE

Diagnostic agents for the detection of couplable components in biological fluids comprising at least one triazene derivative and a carrier therefor.

The present invention relates to new and improved diagnostic agents, i.e. diagnostic articles or devices, for the detection of couplable components present in body fluids. More particularly the invention relates to improved diagnostic agents for the detection of oxalacetic acid, creatinine, phenylpyrivic acid, acetoacetic acid, β-napthylamine, bilirubin, and the like in urine, blood serum, spinal fluid, and other body fluids.

The qualitative detection and quantitative determination of components in urine, blood and other body fluids has, in recent years, become of increasing importance in medicinal diagnosis. Amongst the analytically useful detection reactions there belongs, inter alia, the coupling reaction with diazonium salts which, with the maintenance of appropirate experimental conditions, proceeds exactly, reproducibly, and specifically. However, the disadvantage of all colorimetirc determinations which depend upon the coupling with diazonium salts is the poor stability of the diazo solutions which, therefore, must always be freshly prepared before use.

In German Pat. No. 1,102,444, there is disclosed a diagnostic agent for use in the determination of bilirubin in urine which utilizes the coupling reaction of bilirubin with p-nitrobenzene - diazonium - p - toluene - sulfonate in an acidic solution. A certain simplification in the detection of bilirubin is achieved in this case by making up the relatively stable p-nitrobenzene - diazonium-p-toluenesulfonate in tablet form. For carrying out the analytical reaction, there is needed a special absorbent substrate, such as asbestos paper or a paper impregnated with calcium or barium salts, as well as two pipettes for use in delivering the urine and water to the test site. In actual practice, it would be a considerable simplification if the detection of bilirubin could be carried out with the use of a simple test paper strip. However, this has not been possibel due to the poor stability of diazonium salts, particularly when absorbent carriers are impregnated therewith.

It is an object of the present invention to provide an improved diagnostic agent for use in the detection of couplable components present in body fluids which avoids the disadvantages of the art.

Another object of the present invention is a simple and practical diagnostic agent for use in the detection of couplable components in body fluids which determinations can be carried out rapidly without the use of laboratory equipment and by untrained personnel as routine procedures.

Still another object of the invention is a simple and practical diagnostic agent comprising a test paper, pill or solution for use in the determination of couplable components in body fluids when the same are present in the lowest pathological concentrations.

Other objects will appear hereinafter.

In accordance with the invention, it has now been found that stable diagnostic agents for use in the detection of couplable components present in body fluids are obtained by employing a carrier and preferably an absorbent carrier in conjunction with at least one triazene and/or triazene salt.

Thus, the invention lies in the finding that triazenes and/or their salts provide stable diagnostic agents for detecting couplable components in body fluids of a quality not heretofor obtainable with diazonium salts.

It is admittedly known from the chemistry of dyes to use naphtholate-triazene mixtures which, after application to a textile, are converted at an elevated temperature and in an acidic medium into the desired azo dyestuffs. However, it certainly could not have been foreseen that triazenes would also be suitable for analytically useful coupling reactions. In particular, it was most surprising that, with triazenes and/or their salts, sufficiently stable test papers could be produced because it was known from the literature that triazene papers intended for pH determinations could not be kept for an unlimited period of time (c.f. Houben-Weyl, Methoden der organischen Chemie, vol. III/2, page 119/1955).

According to the invention, the new diagnostic agents provided by the present invention posses considerable advantages in comparison with those hitherto known. Among these advantages the following may be noted:

(1) The diagnostic agents which are produced using triazenes and/or their salts instead of diazo solutions and solid diazonium salts are considerably more stable to decomposition as a result of which dark colored and disturbing products usually are formed;

(2) Solid diazonium salts are, in general, explosive and, therefore, extremely dangerous to handle, whereas most triazenes and, in particular, their salts are not explosive;

(3) Diazonium salts, even those which are relatively stable, are, in general, very light sensitive, whereas the triazenes to be used according to the present invention do not require any special measures to protect them from access of light; and (4) Triazenes and their salts can be used not only for test papers but also for tablets and test solutions and are, therefore, of universal applicability.

In preparing the diagnostic agents according to the present invention, there can, in principle, be used all triazenes and triazene salts which result in coupling products with components present in the body fluids providing analytically measurable dyestuffs. Preferred triazenes to be used according to the present invention are those having the following structural formulae:

$$A-\underset{B}{\underset{|}{\bigcirc}}-N=N-\underset{R_1}{\underset{|}{N}}-R_2 \qquad \underset{(I)}{\qquad} \qquad \underset{\bigcirc}{\overset{X}{\underset{N}{\bigcirc}}}-N=N-\underset{R_1}{\underset{|}{N}}-R_2 \qquad (II)$$

In the above formulas, A and B, which may be the same or different, represent hydrogen, halogen, nitro, sulfonyl, alkyl, aryl, acyl or alkoxy, $R_1$ represents hydrogen, alkyl or aryl, $R_2$ is carboxyalkyl, carboxyaryl, sulfoalkyl or sulfoaryl, or $R_1$ and $R_2$, taken together with the nitrogen atom to which they are attached, can form a ring, and X is an oxygen or sulfur atom or an=N—$R_1$ group, in which event $R_1$ has the same meaning as set out above.

The triazenes are preferably used in the form of their salts. There are suitable for use in the invention, all salts raving a sufficient degree of water-solubility, particularly the alkali metal, ammonium, alkaline earth metal and heavy metal salts. The calcium, barium and zinc salts have proved to be particularly advantageous for use in the preparation of diagnostic agents as set out herein.

Substances which are of particular medicinal interest and which can be detected by means of a coupling reaction are, for example, oxalacetic acid (in the glutamate-oxalate-transaminase test), creatinine, phenylpyruvic acid, acetoacetic acid, β-naphthylamine (in the leucine-amino-peptidase test) and, as already mentioned above, bilirubin, as well as the glucuronide thereof.

The diagnostic agents according to the present invention intended for use, for example, in the detection of bilirubin, are at least as sensitive as the test tablets disclosed in German Pat. No. 1,102,444. However, they are, in particular, considerably more storage stable and, especially in the case of the use of an absorbent carrier, they are much easier to handle. The sensitivity of the diagnostic agents according to the present invention for the detection of bilirubin is, as in the case of the best previously known diagnostic agents, 0.05 mg. percent and is thus quite sufficient for the detection of pathological amounts of bilirubin in either urine or blood serum.

In carrying out the test reaction for bilirubin, it is only necessary to apply, for example, using a small plastic tube or a drinking straw, a somewhat large drop of urine or serum to the test paper and subsequently to add a few drops of aqueous but preferably alcoholic acid. In the case of the presence of bilirubin, the white or yellow test papers show a clear blue spot which can be easily distinguished from the remaining part of the paper. If the test sample does not contain any bilirubin, then the paper remains white. In the case in which a colored triazene salt is used, then a white spot appears in this place. The result can be read off after about half a minute, no other disturbing colorations appear which would otherwise lead to an incorrect diagnosis.

However, the use of triazenes as diagnostic agents for the detection of couplable components in body fluids is not limited to absorbent carriers. The triazenes and their salts can also be successfully made up into diagnostic agents in tablet form or as test solutions. In the case of these forms of the new diagnostic agents according to the present invention, there are also numerous advantages in comparison with the diazonium salts normally used, especially the better storage stability, the stability against the influence of light and the safety in handling.

The following examples are given for the purpose of illustrating the present invention and are not to be construed in limitation thereof.

EXAMPLE 1

Test tablets for the detection of bilirubin

Test tablets for the detection of bilirubin were pressed from a mass which has the following composition:

| | Mg. |
|---|---|
| 3 - methyl - 3 - carboxymethyl - 1-(p-nitro-phenyl)-triazene sodium salt | 10 |
| Sodium carbonate | 10 |
| Sulfosalicylic acid | 100 |
| Gypsum | 40 |

As test substrate there were used both an asbestos paper and a highly absorbent filter paper (Schleicher Schüll 23 S) which had been impregnated with a 10% solution barium chloride (size 2.5 x 2.5 cm.).

The test substrate was moistened with 5 drops of the fluid under investigation, in this instance, blood serum, the above test tablet laid thereon and then moistened with two drops of water. If the test sample contained more than 0.05 mg. percent of bilirubin, then, within the course of half a minute, there developed on the substrate a blue-violet coloration, the intensity of which depends upon the bilirubin content. Red colorations which may possibly occur do not indicate bilirubin.

EXAMPLE 2

Test paper for the detection of bilirubin

A filter paper (Schleicher & Schüll 23 S) was impregnated with the following solution:

3 - methyl - 3 - carboxymethyl - 1-(2',4'-dichloro-phenyl)-triazene calcium salt _____ 0.5 g.
Acetone, ad 100.0 ml.

To the white test paper thereby obtained, there was applied, with a drinking straw, a drop of urine and, subsequently, a mixture of 3 parts methanol and 1 part concentrated hydrochloric acid. When the test sample contained more than 0.05 mg. percent bilirubin, a blue-violet spot formed thereon.

Similar test papers were obtained when filter paper was impregnated with a solution having the following composition:

3 - methyl - 3 - carboxymethyl - 1-(p-acetylphenyl)-triazene zinc salt _____ 1 g.
60% methanol, ad 100 ml.

When a bilirubin-containing serum or urine was applied to this test paper from a drinking straw, then, upon subsequently applying a few drops of a mixture of 3 parts of ethanol and 1 part of concentrated hydrochloric acid, a blue spot appeared.

EXAMPLE 3

Yellow test paper for bilirubin

A filter paper (Schleicher & Schüll 23 S) was impregnated with the following solutions:

3-methyl - 3 - carboxymethyl-1-(p-nitrophenyl)-triazene calcium salt _____ 0.5 g.
Distilled water, ad 100.0 ml.

To the yellow test paper thereby obtained, there was applied, from a drinking straw, a drop of urine and, subsequently, a mixture of 3 parts of ethanol ad 1 part of concentrated hydrochloric acid. When the test sample contained more than 0.05 mg. percent bilirubin, then a blue spot appeared in the yellow field.

Similar test papers were obtained when filter paper was impregnated with the following solutions:

3,3-(2'-carboxy-tetramethylene) - 1 - (p-nitrophen-yl)-triazene sodium or calcium salt _____ 1 g.
Distilled water, ad 100 ml.
3-methyl - 2 - sulfoethyl - 1 - (p-nitrophenyl)-tri-azene calcium salt _____ 1 g.
80% methanol, ad 100 ml.

After the application of drops of urine to these test papers, a mixture of 3 parts of isopropanol and 1 part of concentrated hydrochloric acid was applied dropwise, a blue spot again appearing in the yellow field in the case of the presence of at least 0.05 mg. percent bilirubin. The same results were obtained when a 20% ethanolic solution of sulfosalicylic acid was used in place of the isopropanol and hydrochloric acid.

EXAMPLE 4

Test solutions for the detection of various components in body fluids

In the examples given hereinafter, there were used the following indicator solutions:

(a)

3 - methyl - 3 - carboxymethyl-1-(p-nitrophenyl)-triazene sodium salt _____ 1.0 g.
Ethanol+5 N hydrochloric acid (5:1), ad 100 ml.

(b)

3 - methyl - 3 - carboxymethyl-1-(2-methoxy-5-methyl-4-benzoylaminophenyl)-triazene sodium salt _____ 1.0 g.
Methanol+5 N hydrochloric acid (5:1), ad 100 ml.

(c)

3 - methyl - 3 - carboxymethyl-1-(2-methoxy-5-benzoylamino-phenyl)-triazene sodium salt __ 1.0 g.
Isopropanol+5 N hydrochloric acid (5:1), ad 100 ml.

(d)

3 - methyl - 3 - carboxymethyl-1-(2-methoxy-5-n - butylsulfonamidophenyl) - triazenesodium salt _____ 1.0 g.
Methanol+5 N hydrochloric acid (5:1), ad 100 ml.

(e)

3 - methyl - 3 - carboxymethyl-1-(2,4-dichloro-phenyl)-triazene sodium salt _____ 1.0 g.
Ethanol+5 N hydrochloric acid (5:1), ad 100 ml.

(f)

3 - methyl - 3 - carboxymethyl-1-(p-acetyl-phenyl)-triazene sodium salt _____ 1.0 g.
Ethanol+5 N hydrochloric acid (5:1), ad 100 ml.

The above-mentioned triazenes are of almost unlimited stability either in solid form or in the form of aqueous alcoholic solutions. They are converted into an active state by the addition of an acid. The acid-containing indicator solutions used in the following examples are stable for about one hour.

(A) Detection of bilirubin.—0.5 ml. of indicator solution (a) and (f) were each mixed with 1.0 ml. 2 N hydrochloric acid and 5 ml. of the fluid under investigation. In the case of the presence of bilirubin, there was obtained an intensive blue-violet coloration which, above a content of 0.05 mg. percent, was clearly visible to the eye. The bilirubin content could be evaluated on the basis of comparison color solutions. A photometer was used for more accurate determinations.

The determination of bilirubin in serum and urine is of importance in the diagnosis of diseases of the bile tract and in certain liver disorders such as hepatatis, cirrhosis, etc.

(B) Detection of α-naphthylamine.—0.5 ml. of indicator solution (c) was mixed with 1.0 ml. 2 N hydrochloric acid and 5 ml. of the test fluid. In the case of the presence of α-naphthylamine, there was obtained an intensive violet coloration which, above a content of 0.05 mg. percent, was clearly visible to the eye. The α-naphthylamine content could be determined on the basis of comparison color solutions. A photometer was used for more accurate determinations.

If, instead of indicator solution (c), there was used indicator solution (a), then an intensive red coloration was obtained (absorption maximum at 530 mμ). By determination of the extinctions, extremely small amounts of α-naphthylamine could be determined with great accuracy.

The determination of α-naphthylamine can be of interest for the determination of leucine-aminopeptidase (LAP) in which L-leucyl-α-naphthylamine is used as substrate. The splitting off of α-naphthylamine is catalyzed by LAP. The amount of α-naphthylamine measured after a definite period of time is a measure of the LAP activity. The determination of the LAP activity in serum is a great help in the differential diagnosis of jaundice. In cases of acute hepatitis, pancreatritis and carcinomas, the values of the LAP activity in the serum is also increased.

(C) Detection of oxalacetic acid.—0.5 ml. of each of the indicator solutions (a), (b), (c), (d), and (e) were mixed with 1.0 ml. 2 N sodium hydroxide solution and 5 ml. of test fluid. In the case of the presence of oxalacetic acid, there was obtained an intensive red or red-orange color which could be easily seen with the eye above a content of 1 mg. percent. The oxalacetic acid content could be determined on the basis of comparison color solutions. A photometer was used for more accurate determinations.

The determinations of the oxalacetic acid formed in a definite period of time is a good measure for the glutamate-oxalate-transaminase activity GOT) in the serum. The GOT activity in the serium increases in cases of heart infarct and hepatitis so that its determination has a great diagnostic importance.

(D) Detection of phenylpyruvic acid.—0.5 ml. of indicator solution (b) was mixed with 1.0 ml. 2 N sodium hydroxide solution and 5 ml. of the test fluid. In the case of the presence of phenylpyruvic acid, there was obtained a reddish-violet color reaction which could clearly be seen with the eye above a content of 0.5 mg. percent. The phenylpyruvic acid content could be assessed on the basis of comparison color solutions. A photometer was used for making a more accurate determination.

In the case of new-born infants who are suffering from phenylketonuria, phenylpyruvic acid appears in the urine after about the third week of life. If this disease is recognized in good time, then by the use of a suitable diet, it is possible to prevent these children from developing certain forms of idiocy and mental retardation.

(E) Detection of δ-aminolaevulinic acid.—0.5 ml. of each of the indicator solutions (c), (d) and (f) was mixed with 1.0 ml. 2 N sodium hydroxide solution and 5 ml. of the test fluid. In the case of the presence of δ-aminolaevulinic acid, there was obtained an orange, red or violet coloration which could be clearly seen with the eye above a content of 5 mg. percent. The δ-aminolaevulinic acid content could be more accurately determined on the basis of comparison color solutions. A photometer was used for making more accurate determinations.

δ-Aminolaevulinic acid appears in the urine of patients suffering from porphyria and in the urine of patients suffering from lead poisoning. Therefore, the determination of δ-aminolaevulinic acid is of importance in the recognition of porphyrias and cases of lead intoxication, as well as in the control of patients with diseases of this type and of persons who have to work with lead.

(F) Detection of homogentisic acid.—0.5 ml. of each of the indicator solutions (d) and (f) was mixed with 1.0 ml. 2 N sodium hydroxide solution and 5 ml. of the test solution. In the case of the presence of homogentisic acid, there were obtained red-orange or red-brown colors which could be clearly seen with the eye above a content of 8 mg. percent. The homogentisic acid content could be evaluated on the basis of comparison color solutions. A photometer was used when more accurate determinations were needed.

Homogentisic acid appears in the urine of patients who are suffering from ochronosis.

(G) Detection of o-hydroxyphenylacetic acid.—0.5 ml. of each of the indicator solutions (d) and (f) was mixed with 1.0 ml. 2 N sodium hydroxide solution and 5 ml. of the test fluid. In the case of the presence of o-hydroxyphenylacetic acid, there were obtained intensive red to orange colors which could be clearly seen with the eye above a content of 1 mg. percent. The o-hydroxyphenylacetic acid content could be assessed on the basis of comparison color solutions, a photometer being used for more accurate determinations.

Even in the first few days of life, o-hydroxyphenylacetic acid is present in the urine of babies suffering from phenylketonuria (c.f. under D). The disease can be ascertained in good time by the direct investigation of the baby's urine.

(H) Detection of acetoacetic acid.—0.5 ml. of indicator solution (f) was mixed with 1.0 ml. 2 N sodium hydroxide solution and 5 ml. of the test fluid. In the case of the presence of acetoacetic acid, there was obtained an intensive red-brown color which could be clearly seen with the eye above a content of 1 mg. percent. The acetoacetic acid content could be assessed on the basis of comparison color solutions. A photometer was used for making more accurate determinations.

Acetoacetic acid appears in the urine in the case of an acidosis which can be caused by hunger or diabetes. The testing of the urine of diabetic patients for acetoacetic acid is of great diagnostic importance.

We claim:
1. A method for carrying out an analytical test for the presence of a couplable component selected from the group consisting of bilirubin, oxalacetic acid, creatinine, phenylpyruvic acid, acetoacetic acid α-naphthylamine, β-naphthylamine, δ-aminolaevulinic acid, homogentisic acid and o-hydroxyphenylacetic acid in biological fluids the presence of which in said fluids being caused by bile duct diseases, liver diseases, heart infarct, phenylketonuria, diabetes, pancreatitis and carcinoma, porphyria and lead poisoning or ochronosis, which comprises applying to the surface of a diagnostic agent consisting of at least one triazene derivative selected from the group of compounds having the formulae:

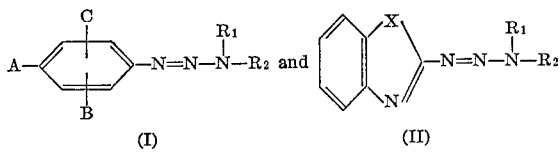

wherein A, B, and C each represents a member selected from the group consisting of hydrogen, halogen, nitro, sulfonyl, alkyl, aryl, acyl, alkoxy, acylamino and alkylsulfonamido, $R_1$ represents a member selected from the group consisting of hydrogen, alkyl and aryl, $R_2$ represents a member selected from the group consisting of carboxyalkyl, carboxyaryl, sulfoalkyl and sulfoaryl, X represents a member selected from the group consisting of oxygen, sulfur and $=N-R_1$ wherein $R_1$ is as previously defined and wherein $R_1$ and $R_2$ taken together with the nitrogen atom to which they are attached can form a ring and an adsorbent diagnostic carrier having a wettable surface, a small amount of the fluid to be tested, thereafter applying a small amount of a mixture of alcohol and hydrochloric acid and examining said diagnostic agent for visual evidence of the presence of said couplable component.

2. A method according to claim 1 for carrying out an analytical test for the presence of bilirubin, wherein said diagnostic agent is a paper sheet impregnated with a solution having the following composition:
3 - methyl - 3 - carboxymethyl-1-(2',4'-dichlorophenyl) triazene calcium salt, and acetone.

3. A method for carrying out an analytical test for the presence of bilirubin in a biological fluid which comprises moistening an absorbent paper strip of paper impregnated with a solution of a member selected from the group consisting of barium chloride and calcium chloride with the fluid to be tested, placing thereon a diagnostic agent consisting of a pulverulent solid carrier in tablet form containing at least one triazene derivative as set out in claim 1, moistening said tablet with a few drops of water and examining the underlying absorbent paper strip for visual evidence of the presence of bilirubin in said fluid.

4. A method for carrying out an analytical test for the presence of a couplable component selected from the group consisting of bilirubin, oxalacetic acid, creatinine, phenylpyruvic acid, acetoactic acid, α-naphthylamine, β-naphthylamine, δ-aminolaevulinic acid, homogentisic acid and o-hydroxyphenylacetic acid in biological fluids the presence of which in said fluids being caused by bile duct diseases, liver diseases, heart infarct, phenylketonuria, diabetes, pancreatitis and carcinoma, porphyria and lead poisoning or ochronosis, which comprises admixing a diagnostic agent consisting of at least one triazene derivative as set out in claim 1 with hydrochloric acid and fluid to be tested in the ratio of 1:2:10 and examining the resulting solution for visual evidence of the presence of said couplable components in said biological fluid.

5. A method for carrying out an analytical test for the presence of bilirubin in a biological fluid which comprises admixing a diagnostic agent consisting of
3-methyl-3-carboxymethyl-1-(p-nitrophenyl)triazene sodium salt, and
ethanol and 5 N hydrochloric acid (5:1)
with hydrochloric acid and fluid to be tested in the ratio of 1:2:10 and examining the resulting solution for visual evidence of the presence of bilirubin in said fluid.

6. A method for carrying out an analytical test for the presence of α-naphthylamine in a biological fluid which comprises admixing a diagnostic agent consisting of
3-methyl-3-carboxymethyl-1-(2-methoxy-5-benzoylamino-phenyl)-triazene sodium salt,
isopropanol +5 N hydrochloric acid (5:1)
with hydrochloric acid and fluid to be tested in the ratio of 1:2:10 and examining the resulting solution for visual evidence of the presence of α-naphthylamine in said fluid.

7. A method for carrying out an analytical test for the presence of oxalacetic acid in a biological fluid which comprises admixing a diagnostic agent consisting of
3-methyl-3-carboxymethyl-1-(2-methoxy-5-n-butylsulfonamido-phenyl)-triazene sodium salt,
methanol +5 hydrochloric acid (5:1)
with hydrochloric acid and fluid to be tested in the ratio of 1:2:10 and examining the resulting solution for visual evidence of the presence of oxalacetic acid in said fluid.

8. A method for carrying out an analytical test for the presence of phenylpyruvic acid in a biological fluid which comprises admixing a diagnostic agent consisting of
3-methyl-3-carboxymethyl-1-(2-methoxy-5-methyl-4-benzoylaminophenyl)-triazene sodium salt, and
methanol and 5 N hydrochloric acid (5:1)
with hydrochloric acid and fluid to be tested in the ratio of 1:2:10 and examining the resulting solution for visual evidence of the presence of phenylpyruvic acid in said fluid.

9. A method for carrying out an analytical test for the presence of δ-aminolaevulinic acid in a biological fluid which comprises admixing a diagnostic agent consisting of
3-methyl-3-carboxymethyl-1-(p-acetylphenyl)-triazene sodium salt, and
ethanol+5 N hydrochloric acid (5:1)
with hydrochloric acid and fluid to be tested in the ratio of 1:2:10 and examining the resulting solution for visual evidence of the presence of δ-aminolaevulinic acid in said fluid.

10. A method for carrying out an analytical test for the presence of homogentistic acid in a biological fluid which comprises admixing a diagnostic agent consisting of
3-methyl-3-carboxymethyl-1-(2-methoxy-5-n-butylsulfonamido-phenyl)-triazene sodium salt,
methanol+5 N hydrochloric acid (5:1)
with hydrochloric acid and fluid to be tested in the ratio of 1:2:10 and examining the resulting solution for visual evidence of the presence of homogentistic acid in said fluid.

11. A method for carrying out an analytical test for the presence of o-hydroxyphenylacetic acid in a biological fluid which comprises admixing a diagnostic agent consisting of
3-methyl-3-carboxymethyl-1-(p-acetylphenyl)-triazene sodium salt,
ethanol+5 N hydrochloric acid (5:1)
with hydrochloric acid and fluid to be tested in the ratio of 1:2:10 and examining the resulting solution for visual evidence of the presence of o-hydroxyphenylacetic acid in said fluid.

12. A method for carrying out an analytical test for the presence of acetoacetic acid in a biological fluid which comprises admixing a diagnostic agent consisting of
3-methyl-3-carboxymethyl-1-(p-acetyl-phenyl)-triazene sodium salt,
ethanol+5 N hydrochloric acid (5:1)
with hydrochloric acid and fluid to be tested in the ratio of 1:2:10 and examining the resulting solution for visual evidence of the presence of acetoacetic acid in said fluid.

13. Diagnostic agent for indicating the presence of bilirubin in body fluids, in the detection of bile duct and liver diseases, comprising at least one triazene derivative selected from the group of compounds having the formulae:

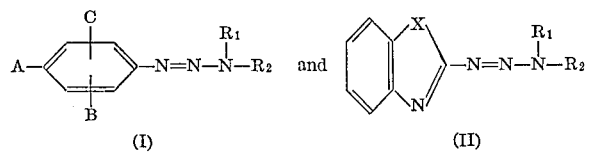

wherein A, B and C each represents a member selected from the group consisting of hydrogen, halogen, nitro, sulfonyl, alkyl, aryl, acyl, alkoxy, acylamino and alkylsulfonamido, $R_1$ represents a member selected from the group consisting of hydrogen, alkyl and aryl, $R_2$ represents a member selected from the group consisting of carboxyalkyl, carboxyaryl, sulfoalkyl and sulfoaryl, X represents a member selected from the group consisting of oxygen, sulfur and $=N-R_1$ wherein $R_1$ is as previously defined and wherein $R_1$ and $R_2$ taken together with the nitrogen atom to which they are attached can form a ring, and an adsorbent diagnostic carrier having a wettable surface.

14. Diagnostic agent according to claim 13 wherein said carrier is a paper sheet.

15. Diagnostic agent according to claim 13 wherein said carrier is a pulverulent solid adapted for tableting.

16. Diagnostic agent according to claim 13 wherein said triazene group member is present in the form of its salt.

17. Diagnostic agent according to claim 13 wherein said triazene group member is present in the form of its salt with a member selected from the group consisting of alkali metals, alkaline earth metals, heavy metals and ammonia.

18. Diagnostic agent according to claim 13 in tablet form having the following composition:
3-methyl-3-carboxymethyl-1-(p-nitro-phenyl)-triazene sodium salt,
sodium carbonate,
sulfosalicyclic acid, and
gypsum 19. Diagnostic agent according to claim 13 in the form of a test paper comprising an absorbent paper sheet having a wettable surface prepared by impregnating said paper sheet with a solution having the following composition:
3-methyl-3-carboxymethyl-1-(2',4'-dichlorophenyl)-triazene calcium salt, and
acetone.

20. Diagnostic agent according to claim 13 in the form of a test paper comprising an absorbent paper sheet having a wettable surface prepared by impregnating said paper sheet with a solution having the following composition:
3-methyl-3-carboxymethyl-1-(p-acetylphenyl)-triazene zinc salt, and
60% methanol.

21. Diagnostic agent according to claim 13 in the form of a test paper comprising an absorbent paper sheet having a wettable surface prepared by impregnating said paper sheet with a solution having the following composition:
3-methyl-3-carboxymethyl-1-(p-nitrophenyl)-triazene calcium salt, and
distilled water.

22. Diagnostic agent according to claim 13 in the form of a test paper comprising an absorbent paper sheet having a wettable surface prepared by impregnating said paper sheet with a solution having the following composition:
3,3-(2'-carboxy-tetramethylene)-1-(p-nitrophenyl)-triazene sodium or calcium salt, and
distilled water.

23. Diagnostic agent according to claim 13 in the form of a test paper comprising an absorbent paper sheet having a wettable surface prepared by impregnating said paper sheet with a solution having the following composition:
3-methyl-2-sulfoethyl-1-(p-nitrophenyl)-triazene calcium salt, and
80% methanol.

References Cited
UNITED STATES PATENTS

| | | | |
|---|---|---|---|
| 2,648,660 | 8/1953 | Lantz | 260—140 |
| 2,854,317 | 9/1958 | Free | 23—230 |
| 2,858,301 | 10/1958 | Petitcolas | 260—140 |
| 2,897,186 | 7/1959 | Miller | 260—140 |
| 2,970,030 | 1/1961 | Bolleter | 8—45 X |
| 3,048,475 | 8/1962 | Rupe | 23—230 |

MORRIS O. WOLK, Primary Examiner

S. MARANTZ, Assistant Examiner

U.S. Cl. X.R.
23—253; 260—140; 424—7; 252—408

Boehr. 276
PF/ey

PO-1050
(5/69)

UNITED STATES PATENT OFFICE
CERTIFICATE OF CORRECTION

Patent No. 3,526,479      Dated September 1, 1970

Inventor(s) Hans-Georg Rey, Hans-Rudolf Lange and Peter Rieckmann

It is certified that error appears in the above-identified patent and that said Letters Patent are hereby corrected as shown below:

Column 1, line 57, "possibel" should be --possible--.

Column 2, line 72, "raving" should be -- having --.

Column 4, line 3, "Schill" should be -- Schüll --.

Column 4, line 32, "solutions" should be -- solution --.

Column 4, line 39, "ad" should be -- and --.

Column 4, line 46, before "3-methyl" insert -- or --.

SIGNED AND
SEALED
DEC 29 1970

(SEAL)
Attest:

Edward M. Fletcher, Jr.
Attesting Officer

WILLIAM E. SCHUYLER, JR.
Commissioner of Patents